US005160573A

United States Patent [19]

Takagi et al.

[11] Patent Number: 5,160,573

[45] Date of Patent: Nov. 3, 1992

[54] TAPE CUTTER DEVICE

[75] Inventors: Yukihito Takagi; Teruo Imamaki, both of Kasugai; Shigeru Nakata, Nagoya; Mikio Sakuma, Ichinomiya, all of Japan

[73] Assignee: Brother Kogyo Kabushiki Kaisha, Japan

[21] Appl. No.: 673,338

[22] Filed: Mar. 22, 1991

[30] Foreign Application Priority Data

Mar. 22, 1990 [JP] Japan .............................. 2-29501[U]

[51] Int. Cl.[5] .............................................. B32B 31/18

[52] U.S. Cl. .................................... 156/510; 156/540; 156/541; 156/542; 83/861; 83/875; 83/879; 83/881

[58] Field of Search ............... 156/257, 268, 510, 267, 156/540, 541, 542, 528, 577, 579; 83/861, 865, 870, 874, 875, 879, 881

[56] References Cited

U.S. PATENT DOCUMENTS 3,615,094 10/1971 Connor ................................ 83/881
4,494,435 1/1985 Lindsay ................................ 83/879

FOREIGN PATENT DOCUMENTS 2400589 7/1974 Fed. Rep. of Germany ........ 83/861
47-16105 5/1972 Japan .

*Primary Examiner*—Caleb Weston
*Attorney, Agent, or Firm*—Oliff & Berridge

[57] ABSTRACT

According to the present invention, a tape cutter device for cutting a tape which comprises a tape substrate coated with an adhesive layer and a separable sheet laid on the adhesive layer comprises: means for receiving the tape; and a cutter blade for cutting the tape received on the tape receiving means to thereby divide the tape into two sections such that at least the adhesive layers of the two sections being separated from each other; wherein, in each section of the tape, an adhesive force of the adhesive layer relative to the separable sheet is greater than an adhesive force of the adhesive layer relative to the cutter blade.

13 Claims, 3 Drawing Sheets

TAPE CUTTER DEVICE

BACKGROUND OF THE INVENTION

The present invention relates to a tape cutter device for cutting an adhesive tape including a tape substrate coated with an adhesive layer and a separable sheet laid on the adhesive layer.

In conventional tape cutter devices for cutting the adhesive tape with such a separable sheet, one specific type adapted for cutting only the tape substrate is well known as a half-cut type tape cutter device. This half-cut type tape cutter device is for example disclosed in a Japanese Examined Patent Application Publication No. 47-16105.

In the case where a portion of the tape near to one end thereof is subjected to the half-cut operation of the tape cutter device, the tape is divided into two sections, a first section being defined between the one end of the tape and the cut portion and a second section being defined between the other end (not shown) of the tape and the cut portion. The first section and the second section are separated from each other at their tape substrate portions and their adhesive layer portions, but are continuously connected with each other at their separable sheet portions. The tape substrate and the adhesive layer of the first section thus defined between the one end of the tape and the cut portion will be referred to as a "half-cut piece", hereinafter.

The thus formed half-cut piece will serve as means for facilitating separation of the separable sheet from the tape substrate when an user desires to separate the separable sheet from the tape substrate. That is, when the user desires to separate the separable sheet from the tape substrate, the user first takes up the half-cut piece. Then, the user pulls up the half-cut piece in a direction in which the separable sheet faces, with holding the tape substrate of the above-described second section. As a result, the separable sheet can be easily and certainly separated from the tape substrate.

The half-cut operation of the conventional cutter device of the above-mentioned Japanese reference will be described below. The cutter device employs a stepped plate for receiving a blade of the cutter. This stepped plate is so figured that a first stepped portion is contactable with a cutter blade but a second stepped portion is not contactable with the cutter blade when the stepped plate receives the blade.

The adhesive tape is first placed on the stepped plate with the separable sheet thereof facing the stepped plate. Then, the cutter blade is moved toward the tape so that the cutter blade reaches the first stepped portion, and then the cutter blade is moved away from the tape. As a result, the tape substrate and the adhesive laye are cut completely, but the separable sheet is cut incompletely. Thus, only the tape substrate coated with the adhesive layer is cut, and therefore the so-called half-cut action is achieved.

However, in the conventional cutter device, while the adhesive tape is being subjected to the half-cut operation, a cut end surface of the tape is in contact with a surface of the cutter blade. Therefore, a cut end surface of the half-cut piece is in contact with one surface of the cutter blade. The cut end surface of the half-cut piece includes a cut end surface of the tape substrate and a cut end surface of the adhesive layer of the half-cut piece. Therefore, the cut end surface of the adhesive layer of the half-cut piece contacted with the surface of the cutter blade is liable to stick to the surface of the cutter blade, due to adhesive force of the cut end surface of the adhesive layer relative to the surface of the cutter blade. Therefore, when the cutter blade is lifted upwardly after when the cutter blade performs the half-cut operation, the half-cut piece stuck to the cutter blade is also lifted upwardly together with the cutter blade, to thereby be separated from the separable sheet. As a result, the half-cut piece remains inside the tape cutter device, when the tape which has been subjected to the half-cut operation is taken away from the cutter device. The half-cut piece thus remaining in the cutter device causes some troubles in succeeding cutting work.

SUMMARY OF THE INVENTION

The present invention is achieved to solve the above-described problems, and therefore it is an object of the present invention to provide an improved tape cutter device for half-cutting an adhesive tape with a separable sheet in which the formed half-cut piece is prevented from being separated from the separable sheet and from remaining in the tape cutter device.

To accomplish the above object, a tape cutter device of the present invention for cutting a tape which comprises a tape substrate coated with an adhesive layer and a separable sheet laid on the adhesive layer comprises: means for receiving the tape; and a cutter blade for cutting the tape received on the tape receiving means to thereby divide the tape into two sections such that at least the adhesive layers of the two sections being separated from each other; wherein, in each section of the tape, an adhesive force of the adhesive layer relative to the separable sheet is greater than an adhesive force of the adhesive layer relative to the cutter blade.

The above-constructed tape cutter device ensures that the adhesive force of the adhesive layer of the half-cut piece relative to the separable sheet is greater than that of the adhesive layer of the half-cut piece relative to the blade surface, so that the half-cut piece cannot be separated from the separable sheet when the cutter blade is lifted upwardly after when the cutter blade completes the half-cutting operation.

BRIEF DESCRIPTION OF THE ACCOMPANYING DRAWINGS

DETAILED DESCRIPTION OF A PREFERRED EMBODIMENT

A preferred embodiment of the present invention will be described in detail with referring to the accompanying drawings.

The tape cutter device according to the invention includes a half-cutting mechanism for cutting a tape substrate and an adhesive layer except for a separable sheet, to thereby form a half-cut piece in the tape. The half-cut piece of the tape facilitates separation of the separable sheet from the tape substrate, as described already.

Figure 1:
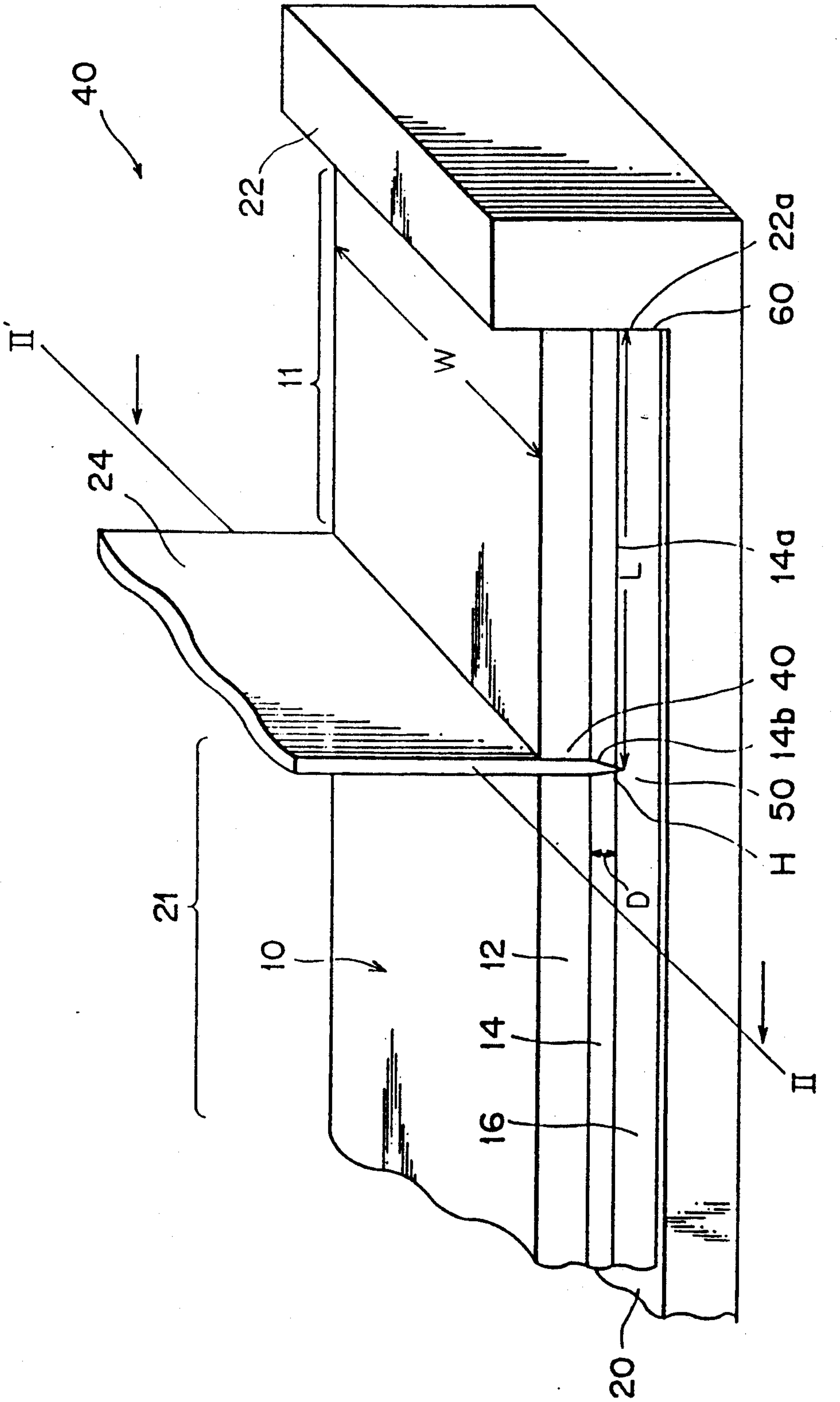
FIG. 1 is a perspective view showing an essential part of the tape cutter device of a preferred embodiment of the present invention.

FIG. 1 is a perspective view showing an essential part of the tape cutter device 40 according to the embodiment of the invention. An adhesive tape 10 includes a tape substrate 12, an adhesive layer 14 and a separable sheet 16 superposed one on another. A tape cutter device 40 for half-cutting the tape 10 mainly includes a tape receiver 20, a stopper 22 and a cutter blade 24. A user places the tape 10 on the tape receiver 20 such that one end of the tape 10 in its longitudinal direction is in abutment contact with a surface 22*a* of the stopper 22. The cutter blade 24 is constructed to move toward and away from the tape receiver 20 so that the cutter blade may be contacted with and separated from the tape receiver 20.

Figure 2:
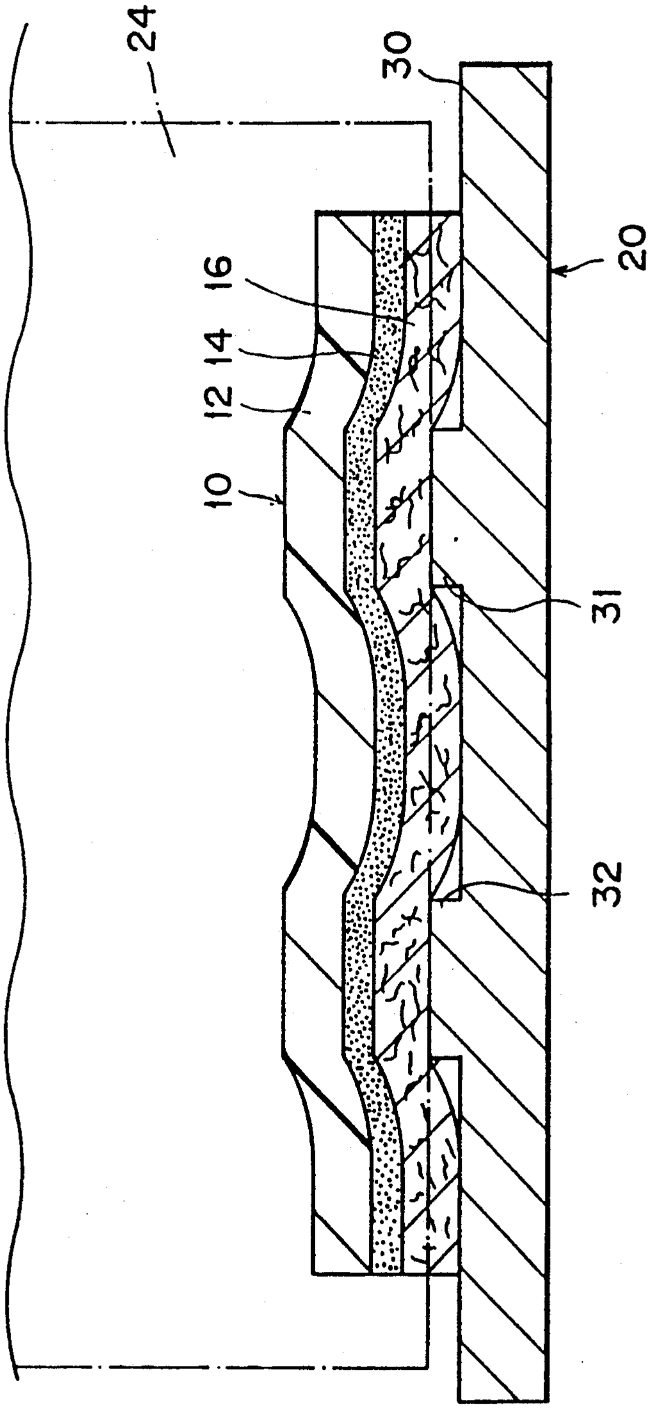
FIG. 2 is a cross sectional view taken along a line II—II' of FIG. 1 for explaining a half-cutting mechanism of the embodiment of the present invention.

The half-cutting mechanism of the tape cutter device 40 of this embodiment of the present invention will be described in detail with referring to FIG. 2, which shows a cross-sectional view taken along a line II—II' in FIG. 1. As seen in the FIG. 2, the tape receiver 20 includes a tape receiving surface 30 on which are formed a pair of protruded portions 31 and 32. The pair of protruded portions 31 and 32 serve as the half-cutting mechanism of the cutter device 40 of this embodiment.

The half-cutting mechanism operates, as follows: The tape 10 is first placed on the tape receiver 20 so that one end of the tape may be in contact with the surface 22*a* of the stopper 22, as shown in FIG. 1. Then, the cutter blade 24 is moved downwardly to be depressed against the tape 10 placed on the tape receiver 20, as a result of which the tape 10 is deformed, as shown in FIG. 2. Then, the cutter blade 24 is moved further downwardly toward the receiver 20 to be brought into contact with upper surfaces of the protruded members 31 and 32, so that the tape substrate 12 and the adhesive layer 14 are cut completely, as shown in FIGS. 1 and 2. To the contrary, as shown in FIG. 2, though the separable sheet 16 is cut completely at its portions placed on the protruded members 31 and 32, remaining portions of the separable sheet 16 which are not placed on the protruded members 31 and 32 are cut incompletely. This is because the tape 10 is deformed due to the depression of the cutter blade against the tape, as described already, and therefore lower portions of the separable sheet 16 are positioned to be lower than the upper surfaces of the protruded members 31 and 32 at their portions other than placed on the protruded members. Therefore, the tape substrate 12 and the adhesive layer 14 are cut completely, but the separable sheet 16 is cut incompletely. As a result, the tape 10 is divided into two sections 11 and 21, the two sections 11 and 21 being separated from each other in their tape substrate portions 12 and in their adhesive layer portions 14 but being continuously connected with each other in their separable sheet portions 16, as shown in FIG. 1. The section 11 serves as the above-described half-cut piece. As apparent from the above, the half-cut operation is achieved by the cooperation of the cutter blade 24 with the protruded members 31 and 32.

When the half-cut piece 11 is formed in the above-described manner, the cutter blade 24 is moved upwardly to be separated from the tape 10. In the cutter device 40 of the present invention, there is further provided such a mechanism as preventing the half-cut piece 11 from being separated from the separable sheet 16 when the cut blade 24 is lifted upwardly. The half-cut piece separation preventing mechanism of the present invention is constructed such that an adhesive force of the adhesive layer 14 of the half-cut piece 11 relative to the separable sheet 16 is made larger than that relative to the cutter blade 24. In this case, the adhesive force of the adhesive layer 14 relative to the separable sheet 16 is imparted from a surface 14*a* of the adhesive layer 14 of the half-cut piece 11 which is contacted with the separable sheet 16, and the adhesive force of the adhesive layer 14 relative to the cutter blade 24 is imparted from a cut end surface 14*b* of the adhesive layer 14 which is contacted with the cutter blade.

Figure 3:
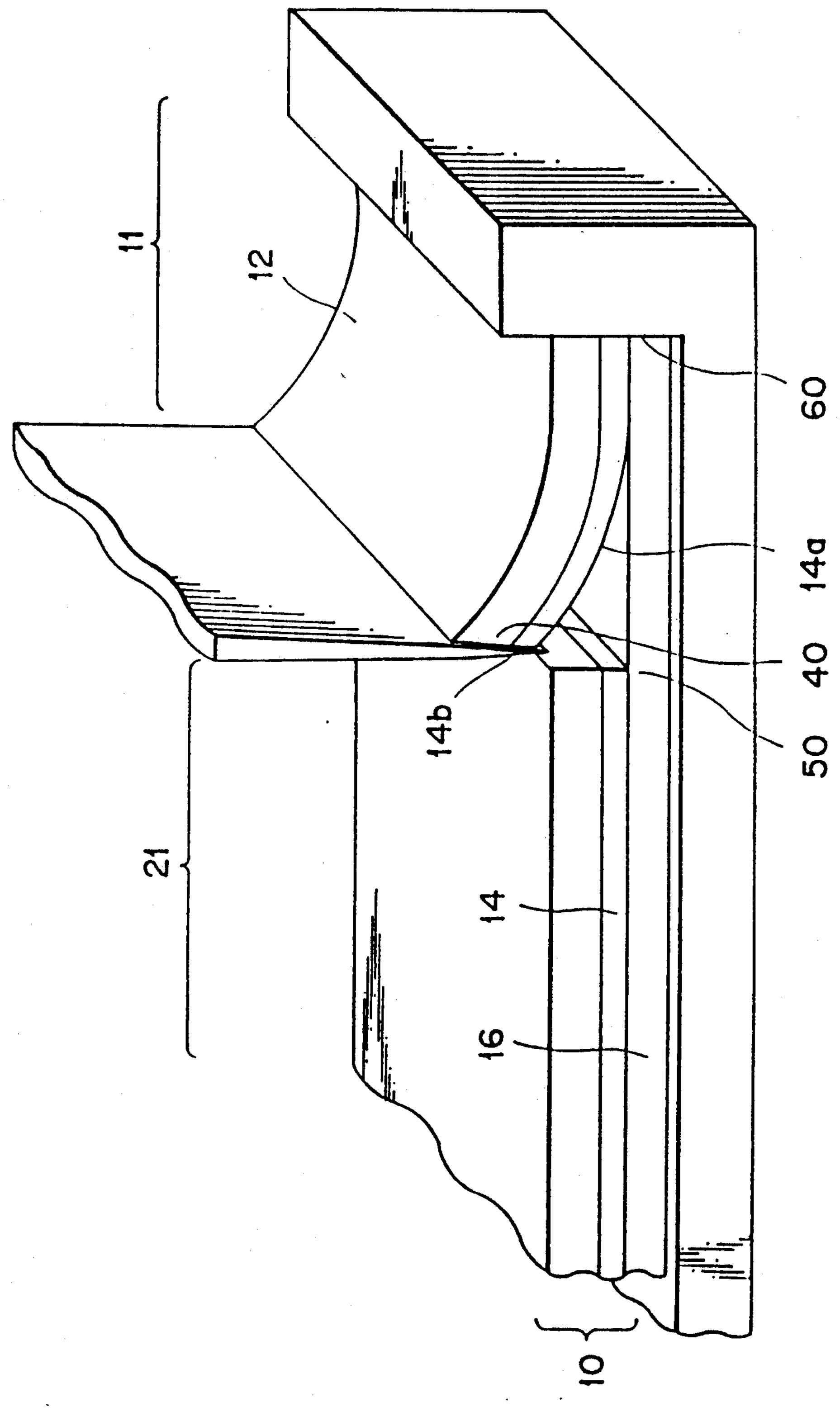
FIG. 3 is a view for explaining a state where a half-cut piece is separated from a separable sheet.

The present inventors have discovered that the half-cut piece is separated from the separable sheet in the case where the adhesive force of the adhesive layer 14 of the half-cut piece 11 relative to the separable sheet 16 is equal to or smaller than that relative to the cutter blade 24. That is, as shown in FIGS. 1 and 3, while the adhesive tape 10 is being subjected to the half-cut operation, a cut end surface of the tape is in contact with a surface of the cutter blade. Therefore, a cut end surface 40 of the half-cut piece 11 is in contact with one surface of the cutter blade 24. The cut end surface 40 of the half-cut piece 11 includes a cut end surface of the tape substrate 12 and a cut end surface 14*b* of the adhesive layer 14 of the half-cut piece 11. Therefore, the cut end surface 14*b* of the adhesive layer 14 of the half-cut piece 11 contacted with the surface of the cutter blade 24 is liable to stick to the surface of the cutter blade 24, due to adhesive force of the cut end surface 14*b* of the adhesive layer 14 relative to the surface of the cutter blade. The adhesive layer 14 has also the surface 14*b* which sticks to the separable sheet 16 due to adhesive force of the surface 14*b* of the adhesive layer relative to the separable sheet 16. Therefore, when the cutter blade 24 is lifted upwardly after when the cutter blade performs the half-cut operation, the half-cut piece 11 stuck to the cutter blade 24 is also lifted upwardly together with the cutter blade, if the adhesive force of the adhesive layer 14 relative to the separable sheet 16 is equal to or smaller than that relative to the cutter blade 24, as shown in FIG. 3. As a result, the half-cut piece 11 is separated from the separable sheet 16. On the other hand, if the adhesive force of the adhesive layer 14 relative to the separable sheet 16 is larger than that relative to the cutter blade 24, the half-cut piece cannot be separeted from the separable sheet 16. Therefore, the half-cut piece separation preventing mechanism of the present invention is constructed such that the adhesive force of the adhesive layer 14 of the half-cut piece 11 relative to the separable sheet 16 is larger than that relative to the cutter blade 24.

According to the cutter device of this preferred embodiment of the present invention, as the half-cut piece separation preventing mechanism, a distance L defined between the tape end contacting surface 22*a* of the stopper 22 and the cutter blade 24 is so determined as to satisfy the conditions, as will be described below.

The adhesive force A of the half-cut piece 11 relative to the separable sheet 16 and the adhesive force B of the half-cut piece 11 relative to the surface of the cutter blade 24 are represented by the following equations:

$$A = L \times W \times \alpha \qquad (1)$$

$$B = D \times W \times \beta \qquad (2)$$

wherein W represents a width of the tape 10 in a widthwise direction of the tape which is perpendicular to its longitudinal direction, D represents a thickness of the adhesive layer 14, $\alpha$ represents an adhesive force per unit area of the adhesive layer 14 relative to the separable sheet 16, and $\beta$ represents an adhesive force per unit area of the adhesive layer 14 relative to a surface of the cutter blade 24. These parameters W, D, $\alpha$ and $\beta$ inherently depend on material of the tape 10 and the cutter blade 24 and dimension of the tape 10. In order to prevent the half-cut piece 11 from being separated from the separable layer 16, the adhesive force A must be greater than the adhesive force B. Therefore, the stopper 22 and the cutter blade 24 are positioned so that the distance L defined between the stopper 22 and the cutter blade 24 may satisfy the following inequality:

$$L > D.\beta/\alpha \quad (3)$$

The above-described half-cut piece separation preventing mechanism performs as follows: after the half-cut operation is performed by the cutter blade 24 and the half-cut piece 11 is formed, the cutter blade 24 is lifted upwardly to be separated from the tape 10. At this time, the cut end surface 14*b* of the adhesive layer 14 of the half-cut piece 11 is contacted with the cutter blade 24, so that the adhesive layer 14 sticks to the cutter blade 24, due to its adhesive force. However, according to the present invention, the half-cut piece 11 cannot be separated from the separable sheet 16 in accordance with the upward movement of the cutter blade 24, since the adhesive force of the adhesive layer 14 relative to the cutter blade 24 is smaller than that relative to the separable sheet 16. Therefore, according to the cutter device of the present invention, the half-cut piece 11 can be certainly prevented from being separated from the separable sheet 16, contrary to the conventional cutter device.

Following are experimental results obtained through an experiment conducted by the inventors of the present invention:

The thickness D of the adhesive layer 14 was selected to be 45 [$\mu$m], the adhesive force $\alpha$ of the adhesive layer relative to the separable sheet 16 per unit area was selected to be $1.25\times10^{-4}$ [N/mm$^2$], and the adhesive force $\beta$ of the adhesive layer relative to the cutter blade 24 was selected to be $1.47\times10^{-2}$ [N/mm$^2$]. In this case, according to the inequality (3) described above, the distance L between the stopper 22 and the cutter blade 24 should be greater than 5.292 [mm]. When the distance L was selected to be greater than 5.292 [mm], the half-cut section 11 was not separated from the separable sheet 16 when the cutter blade 24 was lifted upwardly.

Although the above-described embodiment employs a cutter blade 24 which provides a linearly shaped cut end surface, various types of cutter blades may be used. When a blade of a type capable of providing a non-linearly shaped cut end surface is used, an amount of area of the cut end surface 14*b* of the adhesive layer contacted with the cutter blade 24 and an amount of area of the surface 14*a* of the adhesive layer contacted with the separable sheet 16 should be correctly calculated to determined the distance L.

In this embodiment, furthermore, the positions of the stopper 22 and the cutter blade 24 are fixed in the tape cutter device to have the certain amount of fixed distance L therebetween. However, the stopper 22 and the cutter blade 24 may be adjustably positioned by an user so that the distance L between the stopper and the cutter blade may satisfy the above-described inequality (3).

Furthermore, the stopper 22 may be eliminated from the cutter device. In this case, a distance L between one end 60 of the tape and a cut portion 50 is determined to satisfy the above-described inequality (3), so that the half-cut piece defined between the one end 60 and the cut portion 50 is prevented from being separated from the separable sheet.

The half-cutting mechanism of the present invention is not limited to the above-described manner that the cutter blade 24 cooperates with the protruded members 31 and 32. However, various types of manners of achieving the half-cutting operation may be employed.

As apparent from the above-description, the tape cutter device according to the present invention can ensure that the half-cut piece formed through the half-cut operation is prevented from being separated from the separable sheet at the time of upwardly lifting the cutter blade.

The present invention is not limited to the above-described embodiments, but several changes may be possible without departing from spirit or scope thereof.

We claim:

1. A tape cutter device for cutting a tape having an end and comprising a tape substrate coated with an adhesive layer and a separable sheet laid on the adhesive layer, the device comprising:

receiving means for receiving the tape such that the end of the tape is located at a first position with respect to the receiving means; and a cutter blade for cutting the tape received on said tape receiving means to thereby divide the tape into first and second sections, the first section being defined between the end of the tape and a cut position dividing the tape into the first and second sections and the second section being defined between another end of the tape and the cut position, said cutter blade dividing the tape such that at least the adhesive layers of the first and second sections are separated from each other, wherein the cutter blade is located at a second position with respect to the receiving means, and the distance between the first position and the second position determines lengths of the first and the second sections so that an adhesive force of the adhesive layer of each of the first and the second sections relative to the separable sheet is greater than an adhesive force of the adhesive layer of the each of the first and the second sections relative to said cutter blade.

2. The tape cutter device as claimed in claim 1, further comprising means for controlling said cutter blade to divide the tape into first and second sections so that the tape substrates and the adhesive layers of the first and second sections are separated from each other but the separable sheets of the first and second sections are continuously connected with each other.

3. The tape cutter device as claimed in claim 2, wherein said cutter blade controlling means comprises means for deforming the tape while said cutter blade divides the tape into the first and second sections.

4. The tape cutter device as claimed in claim 3, wherein said tape deforming means includes a stepped portion formed on said tape receiving means.

5. The tape cutter device as claimed in claim 1, wherein the distance between the first position and the second position is $L > D.\beta/\alpha$ wherein L is the distance between the first and second positions, D is a width of the tape, $\alpha$ is an adhesive force of the adhesive layer per unit area relative to the separable sheet, and $\beta$ is an adhesive force of the adhesive layer per unit area relative to the cutter blade.

6. The tape cutter device as claimed in claim 5, further comprising means for controlling said cutter blade to divide the tape into the two sections so that the tape substrates and the adhesive layers of the two sections are separated from each other but the separable sheets of the two sections are continuously connected with each other.

7. The tape cutter device as claimed in claim 6, wherein said cutter blade controlling means comprises means for deforming the tape while said cutter blade divides the tape into the two sections.

8. The tape cutter device as claimed in claim 7, wherein said tape deforming means includes a stepped portion formed on said tape receiving means.

9. A tape cutter device for cutting a tape which comprises a tape substrate coated with an adhesive layer and a separable sheet laid on the adhesive layer, comprising:

means for receiving the tape;

a cutter blade for cutting the tape received on said tape receiving means to thereby divide the tape into two sections such that at least the adhesive layers of the two sections being separated from each other, wherein, in each section of the tape, an adhesive force of the adhesive layer relative to the separable sheet is greater than an adhesive force of the adhesive layer relative to said cutter blade; and stopper means for receiving one end of the tape in such a manner that the one end of the tape is in contact with said stopper means, the two sections of the tape including a first section defined between the one end of the tape and a cut position dividing the tape into the two sections, wherein a distance between the stopper means and said cutter blade is determined so that an adhesive force of the adhesive layer of the first section relative to the separable sheet is greater than an adhesive force of the adhesive layer of the first section relative to said cutter blade.

10. The tape cutter device as claimed in claim 9, wherein the distance L between the stopper means and said cutter blade is determined by an inequality $L > D \cdot \beta / \alpha$ wherein D is a width of the tape, $\alpha$ is an adhesive force of the adhesive layer per unit area relative to the separable sheet, and $\beta$ is an adhesive force of the adhesive layer per unit area relative to the cutter blade.

11. The tape cutter device as claimed in claim 10, further comprising means for controlling said cutter blade to divide the tape into the two sections so that the tape substrates and the adhesive layers of the two sections are separated from each other but the separable sheets of the two sections are continuously connected with each other.

12. The tape cutter device as claimed in claim 11, wherein said cutter blade controlling means comprises means for deforming the tape while said cutter blade divides the tape into the two sections.

13. The tape cutter device as claimed in claim 12, wherein said tape deforming means includes a stepped portion formed on said tape receiving means.

* * * * *